(No Model.)
M. GROSS.
PROCESS OF MAKING EXTRACTS.
No. 393,976. Patented Dec. 4, 1888.
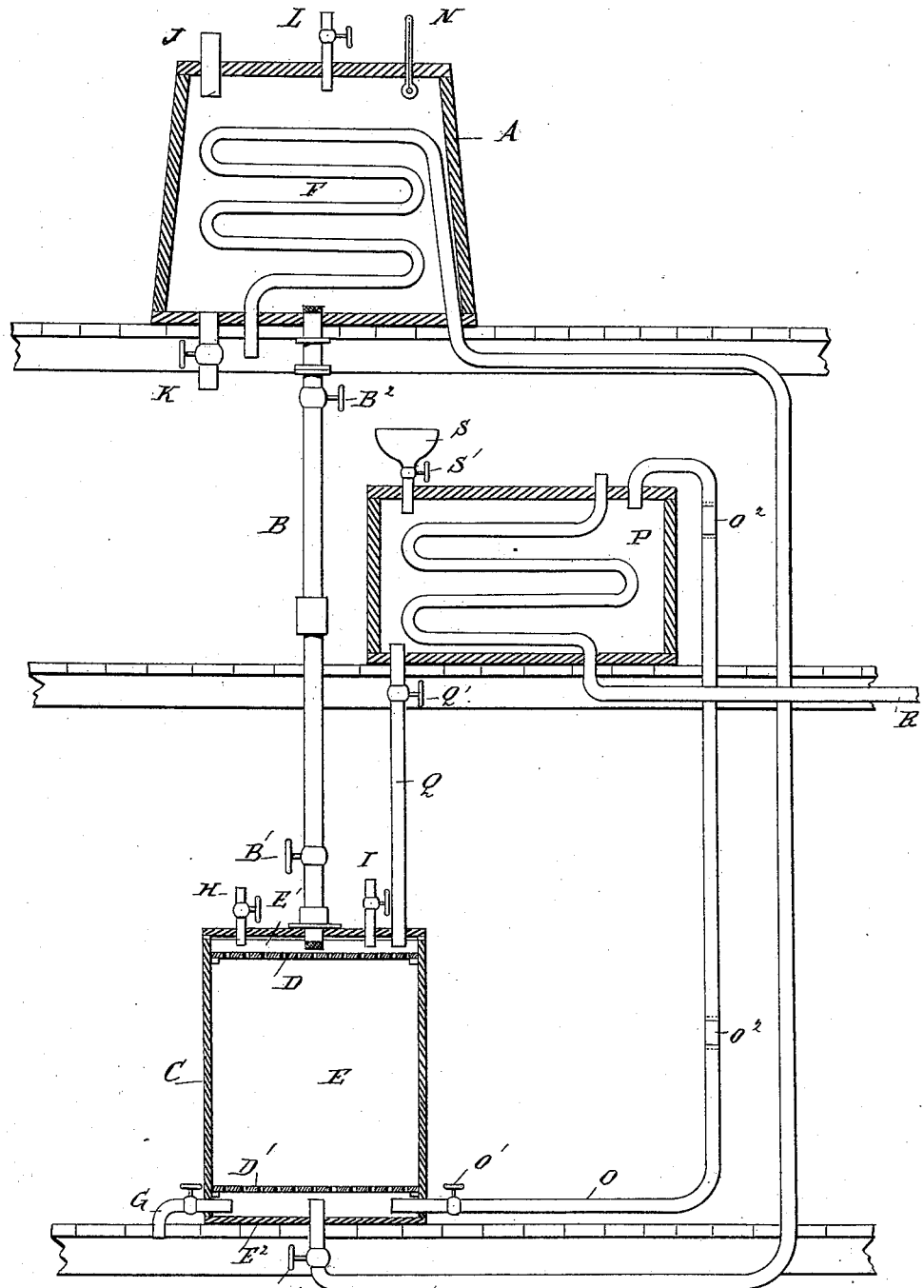

United States Patent Office.

MAGNUS GROSS, OF NEW YORK, N. Y., ASSIGNOR TO JOHN M. MOSER, CHARLES HEIDENHEIMER, JOSEPH KOCH, MAGNUS GROSS, JR., AND LOUIS HEIDENHEIMER, ALL OF SAME PLACE.

PROCESS OF MAKING EXTRACTS.

SPECIFICATION forming part of Letters Patent No. 393,976, dated December 4, 1888.

Application filed September 2, 1887. Serial No. 248,661. (No specimens.)

*To all whom it may concern:*

Be it known that I, MAGNUS GROSS, of the city of New York, in the county and State of New York, have invented a new and Improved Process of Making Extracts, of which the following is a full, clear, and exact description.

My invention relates to the making of extracts.

The object is in a simple, effective, and comparatively inexpensive manner and without loss to make an extract from hops or other matter.

With this object in view the invention consists in placing hops or other suitable substance in condition to part with extractive matter—expanding, softening, and breaking the vesicles or cells containing the same—by steaming in a closed receptacle. Furthermore, in making extract from hops or other suitable substance by placing the same in condition to part with extractive matter—expanding, softening, and breaking the vesicles or cells—by steaming in mass in a closed receptacle, and then dissolving out the matter thus released by subjecting the mass to the action of a suitable solvent under hydrostatic pressure for maceration. Furthermore, in making extracts from hops or other suitable substance by steaming in a closed receptacle, then dissolving out the matter thus released, and then reheating the solvent and again passing it through the mass in the extracting-vessel; and, finally, the invention consists in treating hops or other suitable matter as hereinbefore described and then extracting the last particles of desirable matter by the use of alcohol.

In the accompanying drawing I have shown one form of apparatus by which my invention may be carried into effect.

The figure is a view of vessels, vats, or tanks and pipes suitably arranged and at different altitudes, the vessels being shown in vertical cross-section and the pipes in elevation.

In the drawing are shown three floors or platforms—a top floor, a middle floor, and a lowermost floor—and on each is a vat, tank, or other strong vessel, the vessels being connected by pipes. The topmost vat (marked A) has in its top a water-inlet pipe, (marked J,) a steam-escape pipe, (marked L,) and a thermometer, (marked N.) Upward through its bottom passes a steam-pipe, (marked F,) and formed in the vat into a coil it passes then downward again through the bottom and enters the lower part of the lowermost vat, (marked C,) near which it is provided with a stop-cock, (marked F'.) From the bottom of vat A also lead a water-discharge pipe (marked K,) and a pipe, (marked B,) which connects the top vat with the lowermost vat.

The vat or vessel C (here the extracting-vessel) is provided at a short distance below its cover with a perforated disk or plate, D, there being also a similar perforated disk, D', a short distance above the bottom, and the disks forming a central compartment, E, for the reception of hops or the like. The disks form with the corresponding ends of the extracting-vessel the compartments E' and E². From the compartment E' leads an air-escape pipe, H, provided with a stop-cock on the outside, and the pipes B and Q enter here. The vat E has a valved safety-pipe, I, of any approved construction.

The compartment E² is provided with a stop-cock, G, for drawing off the extract and the pipes F and O enter at convenient points. The pipe O has a stop-cock, O', near the cylinder C, and is provided with short sections of glass, O² O², for inspecting its contents.

The pipes Q and O connect the vessel C with the vat P on the middle floor. Pipe Q connects the lower part of vat P with the compartment E' of cylinder C and has a stop-cock, Q'. Pipe O connects the compartment E² of cylinder C with the upper part of vat P, which is provided with a coiled steam-pipe, R, and with a charging-funnel, S, having a stop-cock, S'.

In carrying out my process I proceed as follows: Water, weak maltose, or wort is pumped into the vat A, its outlets being closed. Steam is admitted to the pipe F, which by its coil within the vat will raise the temperature of the liquid therein contained. By the thermometer N the temperature of the liquid may at all times be ascertained with accuracy. The hops or other substance is put in mass into the compartment E of the cylinder C either through a man-hole or through any other convenient opening, and, the cylinder being closed, steam from pipe F, is admitted to the vessel C by turning the steam-cock F' until a pressure of about two atmospheres is obtained. The valved safety-pipe I and the stop-cock H are then opened to allow compressed steam and air to escape. The cock F' is now closed and the cocks B' and B² are opened to allow the heated water, wort, or weak maltose to descend from the vat A and extract the resinous and aromatic constituents of the hops. The hops and solvent medium are now left at rest under the pressure of the column of liquid in pipe B for an hour or more for the purpose of digestion, the progress of extraction being investigated by inspection of the liquid at the outlet G. The admission of steam to the hops in the vessel C serves a double purpose—namely, that of warming the hops and that of breaking the vesicles or cells in which the matter to be extracted is contained—thus insuring quicker action on the part of the incoming solvent, whether it be water, wort, or spirits. The steam is not to be employed as a solvent only, but for the double purpose stated. If after maceration in the vessel C the mass is sufficiently exhausted, the liquor may at once be drawn off by closing the cock B', opening the outer cock, G, and opening the valves in pipes H and I. If, however, the mass is not sufficiently exhausted of the extractive matter, the valve O' is opened and the liquid is allowed to ascend through pipe O into the vessel or tank P by the pressure of the column of liquid in pipe B from vat A, faucet G and valves in pipes H and I being closed and the connections between vessel A and C freely open. In the tank P the liquor is reheated. The liquid may be observed through the sections O² O² as it passes from vessel C to tank P. Tank P having been filled in this manner, cock B' is closed and cock Q' opened to allow the extract slowly to pass through the hops in the compartment E once more and out at G, the liquid thus taking out more extractive matter. After both vat P and vat C are drained cock O', cock Q', and faucet G are closed, the cock B' is opened again, and communication between vat A, pipe B, and vat C is restored. Another round of extraction and circulation is performed as above described, and this is repeated until the hops or other material are exhausted. Ordinarily three or four rounds will suffice to exhaust all the desired matter.

Under some circumstances it may be desirable to extract the last traces of resinous and other matter—that is, all residual matter from the mass—or entirely to exhaust the residuum. To do this, I employ alcohol or any suitable spirit, and the product may serve for inspissation and storage.

In employing the spirit I proceed as follows: The connection with vat A is interrupted by closing cock B', and all the aqueous liquid remaining in vat C and vat P is drained off through faucet G, or by some special faucet provided for that purpose. This having been done, the cocks at H, I, G, O', and Q' are closed and steam is cut off from the coil in vat P. The cock S' in the neck of the funnel S is now opened and into vat P is poured spirit equal in weight to the quantity of dry hops first employed. The cock O' is now opened and the spirit descends to the hops in vat C. After several hours of maceration faucet G, or a special faucet, is partly opened in order slowly to draw off the spirituous product in vat C. When the spirituous extract has been run out of the vessel C, partial communication is restored with vat A by slightly reopening cock B', whereupon aqueous liquid then washes out the dregs.

It will be obvious that by my method extracts of various strengths may be obtained from the hops and that the extracts may be either kept separate or mixed together, according to the wants of the brewer. It is also very plain that the weaker extracts may be used to obtain stronger ones by repeating the process, using the weak extract as a solvent medium.

I may vary the degrees of heat at which I use the water or wort; but I prefer to use these solvents at heat of about 180° Fahrenheit.

The hops or other matter, substance, or substances may be put into the vessel C either in a natural state or finely divided.

Having thus fully described my invention, what I claim as new, and desire to secure by Letters Patent, is—

1. The process of extracting hops or other substance, which consists in first placing the same in condition to part with the extractive matter, expanding, softening, and breaking the vesicles or cells by a preparatory steaming in a closed receptacle, and then dissolving out the matter thus set free by subjecting the substance to the action of a suitable solvent under hydrostatic pressure, substantially as described.

2. The process of extracting hops or other substance, which consists in first placing the same in condition to part with extractive matter by preparatory steaming, then subjecting to the action of a suitable solvent under hydrostatic pressure, then reheating the extract thus obtained, and then passing it through the contents of the extracting-vessel, substantially as described.

3. The herein-described process of obtaining the entire extractive matter from hops or other suitable substance, which consists in first steaming the substance in a closed vessel, then subjecting it to hydrostatic pressure of aqueous liquid and drawing off the aqueous solution obtained, then subjecting it to the action of spirituous liquid (exhausting the mass) and drawing off the spirituous solution obtained, substantially as set forth.

MAGNUS GROSS.

Witnesses:
THEO. G. HOSTER,
EDGAR TATE.